July 16, 1929.                H. METZ                1,721,462
TWO-SHARE PLOW
Filed April 18, 1927
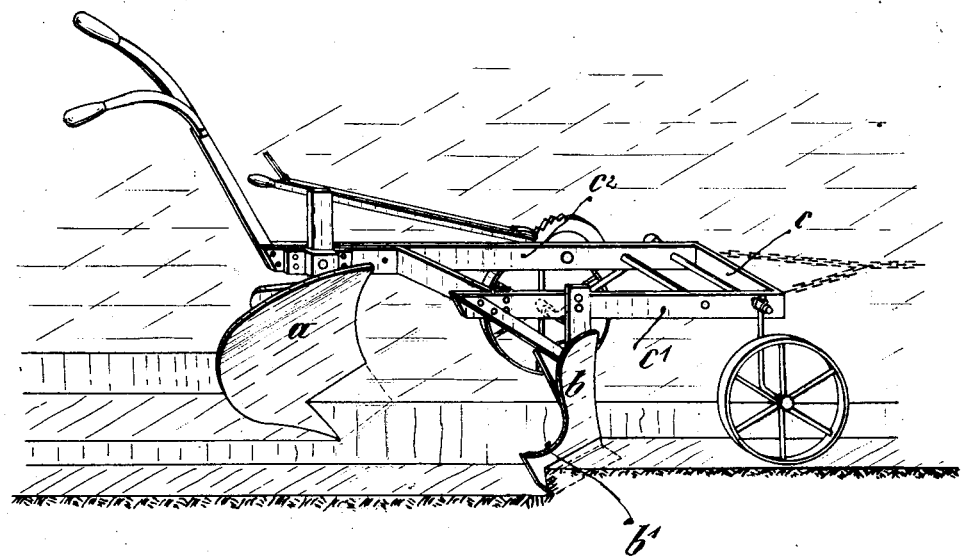
Inventor
Heinrich Metz
by
Attorney Patented July 16, 1929.

1,721,462

UNITED STATES PATENT OFFICE.

HEINRICH METZ, OF FROMMERSHAUSEN, NEAR KASSEL, GERMANY.

TWO-SHARE PLOW.

Application filed April 18, 1927, Serial No. 184,721, and in Germany January 28, 1927.

The invention relates to the type of plow in which a sub-soiling share is located in front, and to the side of, the main share or plow breast, the sub-soiling share running in the furrow last made and the plow breast turning the soil onto the furrow which has just previously been subsoiled. Whereas in previous plows of the type set forth the subsoiling share has been designed merely to loosen the deep soil, or has been provided with an upwardly and rearwardly inclined platform which merely elevates the earth and throws it back in a clod, the subsoiling share according to the present invention is so designed, that the deep subsoil is turned over behind the share in a crumbly condition to permit of aeration, and to meet the desired conditions set forth.

The invention is illustrated diagrammatically and by way of example on the accompanying drawing, which shows a perspective representation of a two-share plow designed according to this invention. The constructional form shown is of simple design and consists chiefly of a horizontal U-shaped frame $c$ $c^1$ $c^2$ provided at its front end with the usual wheels and carrying at its legs which are of unequal length two shares $a$ and $b$, the share $a$ being the rear share and attached to the frame leg $c^2$ and the share $b$ being the front share and attached to the frame leg $c^1$. The share $b$ extends to a greater depth than the share $a$ and the two shares are, with respect to one another, so arranged that the share $b$ is located righthand from the share $a$, although in front of, and obliquely with respect to, it. The ground is, thus, cut in a step-like manner, as shown. The shares stand obliquely also with respect to their direction of motion, as is also apparent from the drawing, the lefthand edge of each of them being nearer the wheels than the righthand edge. The share $b$ stands vertical and is provided with a large recess $b^1$ resembling one half of a U, and the share $a$ is curved in itself, whereby the earth is carried forward and turned over in itself.

The front share is the most important part of the plow and constitutes the invention proper. The greater effect sought to be, and being, attained is attained just by the particular configuration of said share. The main and decisive features are these that the practically vertical front share which stands obliquely with respect to the direction of movement of the plow has its upper portion so cut that its upper edge is shaped like an S and the convex upper portion of the share pertains to its front half and the concave lower portion to its rear half with respect to the direction of motion of the plow. Owing to this particular configuration of the said share the earth thrown up in the depth is thrown rearwardly in its own furrow whereby it is thoroughly crumpled and ventilated.

The position and shape of the share $b$ is such that the strip of earth severed off by it is turned rearwardly, and the position and shape of the share $a$ is such that the strip of earth severed off by it is turned over to the right upon the earth that has been turned rearwardly by the share $b$. This operation of the share $a$, viz. turning the uppermost layer of the ground, i. e. the ready soil, over upon the deeper layer of the ground constitutes a distinguishing feature of this plow by which it excels the ordinary two-plow share by which the ready soil is conveyed to below the ground severed off by the front share, whereas the ready soil is, with the present improved plow, conveyed upon the ground severed off by the front share. The effect is due, of course, to the particular arrangement of the shares relatively to one another, as well as to the different cutting depth of the same and to their shapes, so that the ground is severed off in strips in such a manner that steps are formed whereby actual deep-soil culture is rendered possible and the bottom bacteria are maintained fully active, also as regards the generation of nitrogen by them so that a corresponding amount of nitrogen is saved. The seed-bed obtained by means of the improved plow is considerably better than heretofore in that it is "ready", as well as porous, and it is also rendered possible to subdue and overcome weeds far more effectively. Dung and other natural manure can be inserted into the ground in such depth as best suited with consideration to the condition of the ground. The plow can be used either simply for cutting and turning work, as well as for seeding work, especially, however, for deep-soil culture work, as discussed in the introductory part of this specification.

I wish it to be understood that I do not limit myself to the exact details shown in the drawing. There may be departures in the details without departing from the invention as disclosed not only in the descriptive part of this specification, but in the introductory part, too.

I claim:

A plowing structure, comprising a frame, two plows secured thereto for plowing at different levels, the deep soil plow comprising a practically vertical front share standing obliquely with respect to the direction of movement of the plow and having its upper edge S-shaped, the upper half of said share being convex and the lower half being concave.

In testimony whereof I affix my signature.

HEINRICH METZ.